(12) United States Patent
Zeidler et al.

(10) Patent No.: US 8,650,941 B2
(45) Date of Patent: Feb. 18, 2014

(54) METHOD FOR TESTING THE FUNCTIONALITY OF AT LEAST ONE INJECTOR

(75) Inventors: Johannes Zeidler, Backnang (DE); Steffen Peischl, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 243 days.

(21) Appl. No.: 12/998,010

(22) PCT Filed: Oct. 1, 2009

(86) PCT No.: PCT/EP2009/062732
§ 371 (c)(1),
(2), (4) Date: Jul. 14, 2011

(87) PCT Pub. No.: WO2010/040676
PCT Pub. Date: Apr. 15, 2010

(65) Prior Publication Data
US 2011/0259094 A1    Oct. 27, 2011

(30) Foreign Application Priority Data
Oct. 6, 2008 (DE) .......... 10 2008 042 605

(51) Int. Cl.
*G01M 15/02* (2006.01)
(52) U.S. Cl.
USPC ........................................ 73/114.45

(58) Field of Classification Search
USPC .............. 73/114.38, 114.45, 114.48, 114.49, 73/114.51, 114.77
See application file for complete search history.

(56) References Cited

U.S. PATENT DOCUMENTS

| | | | |
|---|---|---|---|
| 8,146,562 B2* | 4/2012 | Yezerets et al. ........... | 123/198 D |
| 2008/0201061 A1 | 8/2008 | Fach et al. | |
| 2011/0113756 A1* | 5/2011 | Yezerets et al. ................. | 60/276 |

FOREIGN PATENT DOCUMENTS

| | | |
|---|---|---|
| CN | 101128665 | 2/2008 |
| DE | 196 20 038 | 11/1997 |
| DE | 10 2004 028 515 | 11/2005 |
| DE | 10 2005 029 137 | 2/2007 |
| DE | 10 2006 059 675 | 6/2008 |
| DE | 10 2007 007 815 | 8/2008 |

* cited by examiner

*Primary Examiner* — Eric S McCall
(74) *Attorney, Agent, or Firm* — Kenyon & Kenyon LLP

(57) ABSTRACT

A method for checking the functionality of at least one injector (10) of an internal combustion engine (8), in which at least the functionality of a lambda sensor (12), which is designed to ascertain a state of the at least one injector (10) is checked, a steady-state operating condition of the internal combustion engine (8) being set, and a check being performed as to whether at least one signal of the lambda sensor (12) is stable for the set operating condition. Depending on whether the signal of the lambda sensor (12) is stable, a lambda value for the at least one injection valve (10) is measured using the lambda sensor (12) at the set operating condition.

17 Claims, 2 Drawing Sheets

METHOD FOR TESTING THE FUNCTIONALITY OF AT LEAST ONE INJECTOR

BACKGROUND OF THE INVENTION

1. Field of the Invention

The present invention relates to a method for checking the functionality of at least one injector, a device for checking the functionality of at least one injector, a computer program and a computer program product.

2. Description of Related Art

Due to the increasing complexity of the systems and components used in vehicles, a great diagnostic depth is required in combination with rapid and successful troubleshooting at service shops. For example, fuel injection systems and also air systems and exhaust gas systems of vehicles are increasingly tested and/or checked there.

So-called injectors are used for injecting fuel into the internal combustion engine in the case of diesel engines. Because of wear, such injectors may begin to leak at the injection nozzle, allowing fuel to enter the combustion chamber in an uncontrolled manner. This leakage usually occurs only at certain operating points of the injector.

To monitor and regulate, during operation, internal combustion engines used in motor vehicles, so-called lambda sensors are among the sensors used, contributing toward an improvement in the exhaust gas quality of motor vehicles. Such sensors are based on known electrochemical measurement of the oxygen concentration in the exhaust gas.

A method for monitoring a fuel metering system of an internal combustion engine, in particular of a common rail system, is known from published German patent application document DE 196 20 038 A1. In this case, a defect in the fuel metering system is detected when a signal supplied by a sensor for an exhaust gas composition deviates from a preselectable value. The sensor may supply a signal which depends on the oxygen concentration in the exhaust gas. The defect is detected when the signal for the exhaust gas composition deviates from a preselectable threshold.

SUMMARY OF THE INVENTION

The present invention relates to a method for checking on the functionality of at least one injector of an internal combustion engine in which the functionality of the lambda sensor, which is designed to ascertain a state of the at least one injector, is checked first. For this purpose, a steady-state operating condition is established for the internal combustion engine and a check of whether at least one signal of the lambda sensor is stable for the set operating condition is performed. Furthermore, depending on whether the signal of the lambda sensor is stable, a lambda value for the at least one injector of the internal combustion engine is measured using the lambda sensor under the set operating condition.

Thus, with this method a check of the functionality of the lambda sensor is performed before checking the functionality of the at least one injector. This measure may be performed several times in succession. If, during operation of the internal combustion engine, a defect is detected by a control unit monitoring this operation, this defect may be isolated and consequently unambiguously allocated to the at least one injector or to the lambda sensor, which is to monitor a function of the at least one injector, as part of diagnosing the defect in a service shop, for example.

Additional advantages and embodiments of the present invention are derived from the description and the accompanying drawings.

It is self-evident that the features mentioned above and those yet to be explained below may be used not only in the particular combination indicated here but also in other combinations or alone without going beyond the scope of the present invention.

DETAILED DESCRIPTION OF THE INVENTION

Figure 1:
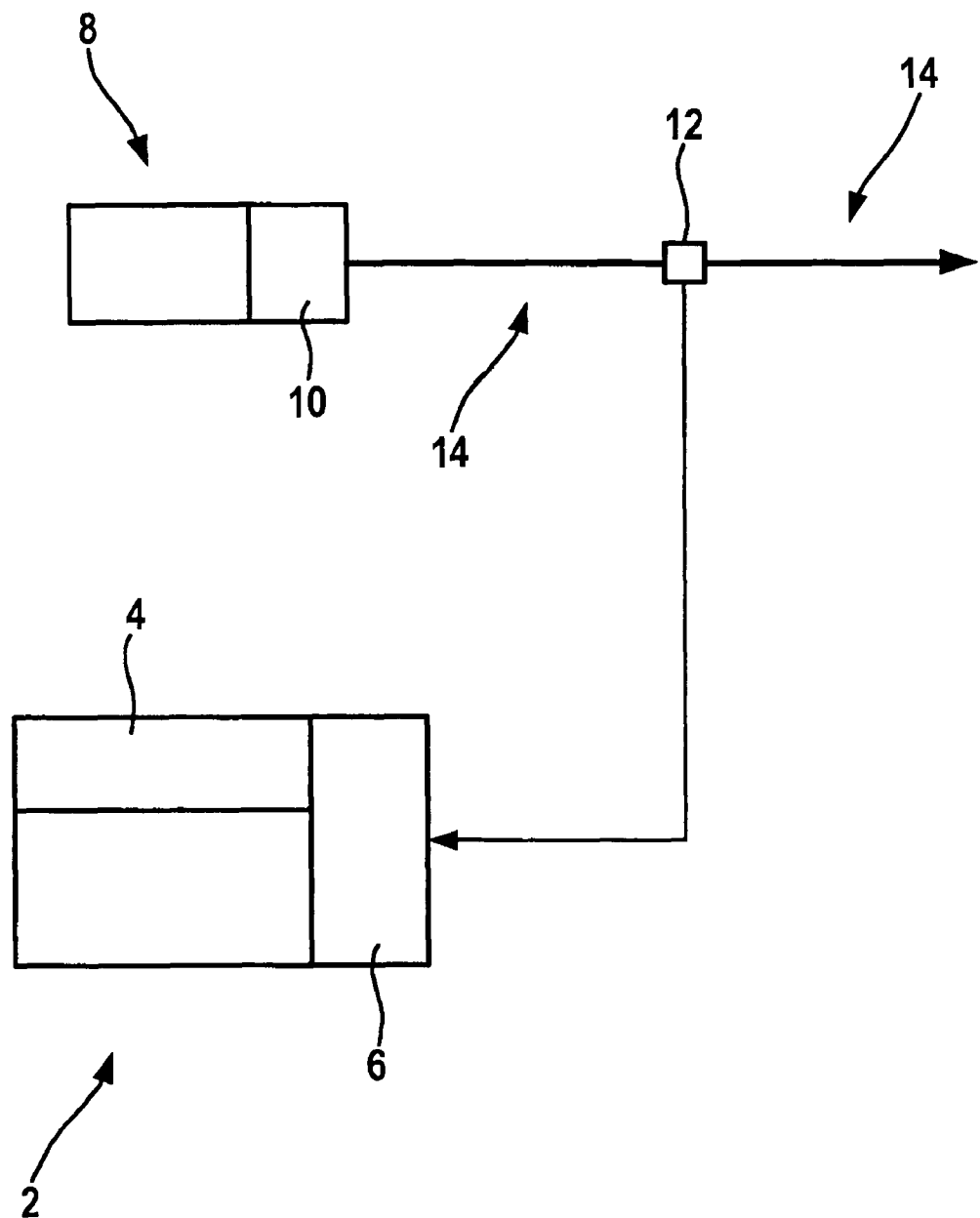
FIG. 1 shows in a schematic diagram an arrangement having a specific embodiment of a device according to the present invention.

Among other things, the present invention relates to the check of the functionality of at least one component of two components of an internal combustion engine, namely the lambda sensor as the first component and the at least one injector as the second component. A test of the at least one injector to be performed using the lambda sensor is performed under the assumption that it is ensured that the lambda sensor is functioning and is suitable for performing the test.

In a possible continuation of the method, the functionality of the lambda sensor is checked at least one second time after having performed the measurement of the lambda value for the at least one injector. A steady-state operating condition is set anew for the internal combustion engine, checking on whether at least one signal of the lambda sensor is stable for the set operating condition, a lambda value for the at least one injector being measured anew using the lambda sensor at the set operating condition, depending on whether the signal of the lambda sensor is stable.

The first and the at least one second check of the functionality of the lambda sensor may be performed under the same steady-state operating condition or under different steady-state operating conditions. The same thing is also true of the operating condition under which the functionality of the at least one injector is checked using the lambda sensor. The operating conditions may be reset between two test cycles, each including the check of the lambda sensor and of the at least one injector under the same steady-state operating condition.

To check on the functionality of the at least one injector, at least one lambda value measured for the at least one injector may be analyzed. If multiple test cycles are performed in succession, the lambda values measured for the at least one injector may be compared with one another.

In one embodiment of the method, a check is performed as to whether the signal of the lambda sensor has reached a target value in a stable manner. A decision about whether the lambda sensor is functional and consequently suitable for detection of relevant lambda values for the at least one injector is usually made as a function of the stability of the signals of the lambda sensor. The signal in this embodiment is stable when fluctuations in values of the signal are within a predefined tolerance. Such a tolerance may depend on the embodiment of the lambda sensor or the particular operating condition set, which may include at least one operating point. The tolerance provided for checking the stability of the signal may be defined on the basis of setpoint values which are usually to be expected for the signal as a function of the set operating condition, among other things, and are consequently to be defined.

An overrun condition of the internal combustion engine may be set as the operating condition, which includes at least one operating point. In this overrun condition, the engine of the vehicle is moved, i.e., driven, while the drive train is inactive. The energy of movement of the rotating wheels of the vehicle is transmitted to the engine. The supply of fuel during the overrun condition may be interrupted by providing an overrun cutoff. Predefined operating points are usually set in order to set an operating condition for a number of components of the internal combustion engine.

The present invention also relates to a device for checking on the functionality of at least one injector of an internal combustion engine, which is designed to initially check the functionality of a lambda sensor, which is designed for ascertaining a state of the at least one injector. The device includes a control unit, which is designed to set a steady-state operating condition for the internal combustion engine. Furthermore, the device includes an analysis unit, which is designed to check on whether at least one signal of the lambda sensor is stable for the set operating condition. The device is designed to measure a lambda value for the at least one injector using the lambda sensor under the set operating condition, depending on whether the signal of the lambda sensor is stable.

Using the analysis unit of the device, it may be found that the lambda sensor is not functional if the signal of the lambda sensor is not stable. Similarly, using the analysis unit, it may be found that the lambda sensor is functional if the signal of the lambda sensor is stable.

For the diagnosis, the oxygen partial pressure in the exhaust gas of the internal combustion engine, for example, is detected by a broadband lambda sensor under various operating conditions and then analyzed in a control and analysis unit of the device.

In this method, at least one analysis of predefined steady-state operating points of the internal combustion engine is performed. Thus, a reliable diagnosis of an injector nozzle leakage is possible without detecting defects due to defects in the lambda sensor. Furthermore, defects in an injector or a fuel injection nozzle and the lambda sensor may be differentiated from one another and thus isolated. In one embodiment, a diagnostic separation between a nozzle leakage in common rail injectors and lambda sensor defects is possible.

Detection of leakage of the injector thus usually depends on the condition of the engine and of the lambda sensor. Thus, a lambda sensor which is subject to tolerances or a lambda sensor having dynamic problems may result in detection of defects that are not present.

The diagnostic method performed using the proposed method and/or by the proposed device is designed in such a way that this defect detection is avoided by differentiating between the lambda sensor defects and fuel injector leakage. This eliminates subjective evaluation criteria, resulting in a high reproducibility of the diagnosis. In particular it prevents misdiagnoses and permits an unambiguous assignment of the actual cause of the defect to the corresponding component, i.e., the fuel injector or the lambda sensor, so that removal of the components to be diagnosed is avoidable.

The device described here is designed to perform all the steps of the method presented hereby. Individual steps of this method may also be performed by individual components of the device. In addition, functions of the device or functions of individual components of the device may be implemented as steps of the method. Furthermore, it is possible for steps of the method to be implemented as functions of individual components of the device or as functions of the device.

In one variant of the method, for diagnosing the oxygen partial pressure in the exhaust gas of the internal combustion engine, the oxygen partial pressure in the exhaust gas of the internal combustion engine is detected by using a broadband lambda sensor under various operating conditions, and the results are analyzed in a control and analysis unit of the device. When new operating conditions are defined, the signal of the lambda sensor is also processed by the control and analysis unit, for example, a service shop diagnostic tester. For this purpose, a suitable operating point of the internal combustion engine is predefined. Next, the lambda value is measured after a certain waiting period.

Next, another suitable operating point is again predefined and the lambda value is again measured after a certain waiting period. Next, the two measured lambda values are analyzed. On the basis of the analysis of the two measured lambda values, leakage of the nozzles of the fuel injectors, for example, may be inferred due to the aforementioned choice of suitable operating conditions, but this is possible only if the lambda sensor is intact.

To minimize effects of the air system on the lambda sensor, relevant actuators are set at fixed predefined values for the operating conditions during the entire sequence. A suitable operating point of the internal combustion engine is thereby specified. To increase the selectivity, an operating point without injections is selected. In one specific embodiment, the so-called overrun condition is provided for this purpose.

In addition, after setting at least one operating point, there is a check on whether the signal of the lambda sensor has reached a target value in a stable manner. The lambda value is measured only after this has been confirmed. This principle is also employed under the second operating condition or at the second operating point. The two measured lambda values are analyzed next. Through the aforementioned choice of suitable operating conditions, leakage of the nozzles of the fuel injectors may be inferred on the basis of the analysis of the two measured lambda values. However, if the two signals of the lambda sensor do not achieve stable levels, then a defect of the lambda sensor is inferred instead and may be due to a problem with the dynamics, for example.

The present invention also relates to a computer program having program code means to perform all the steps of a method as described here when the computer program is executed on a computer or a corresponding computation unit, in particular in a device according to the present invention.

The computer program product according to the present invention having program code means, all of which are stored on a computer-readable data medium, is embodied for performing all the steps of a method as described here when the computer program is executed on a computer or a corresponding computation unit, in particular in a device according to the present invention.

The present invention is diagrammed schematically in the drawings on the basis of specific embodiments and is described in detail below with reference to the drawings.

The figures are described together and comprehensively, using the same reference numerals to identify the same components.

FIG. 1 shows a schematic diagram of a specific embodiment of a device 2 according to the present invention for diagnosing nozzle leakage in an injector 10, i.e., a fuel injector of an internal combustion engine. This device 2 includes a control unit 4 and an analysis unit 6. Furthermore, FIG. 1 shows in a schematic diagram a specific embodiment of an internal combustion engine 8, shown here as an injector 10 of this internal combustion engine 8. FIG. 1 also shows a lambda sensor 12, which is assigned to injector 10. This lambda sensor 12 is designed to ascertain, i.e., to measure, a lambda value, i.e., a fuel/air ratio of exhaust gases 14 of injector 10 of internal combustion engine 8.

For implementation of one specific embodiment of the method, at least one check cycle is performed, during which a functionality of lambda sensor 12 is checked first, and depending on whether the lambda sensor 12 is functional, a functionality of injector 10 is checked. In one variant of the present invention, a check of the functionality may also be performed for a plurality of injectors 10 using lambda sensor 12.

For this purpose, a steady-state operating condition including at least one steady-state operating point is predefined by control unit 4 for internal combustion engine 8 so that internal combustion engine 8 is operated at this operating condition. At this operating condition, analysis unit 6 ascertains whether a signal supplied by lambda sensor 12 is stable so it fluctuates only in a tolerance range defined as a function of the operating condition.

If the signal is not stable, analysis unit 6 ascertains that lambda sensor 12 has a defect. If the signal is stable, it is assumed that lambda sensor 12 is functional. Next, a measurement of a lambda value of exhaust gases 14 of injector 10 is performed by lambda sensor 12 under the same operating condition, an oxygen partial pressure of exhaust gases 14 also being ascertained using this value. Analysis unit 6 ascertains whether injector 10 is functional by analyzing the lambda value.

Figure 2:
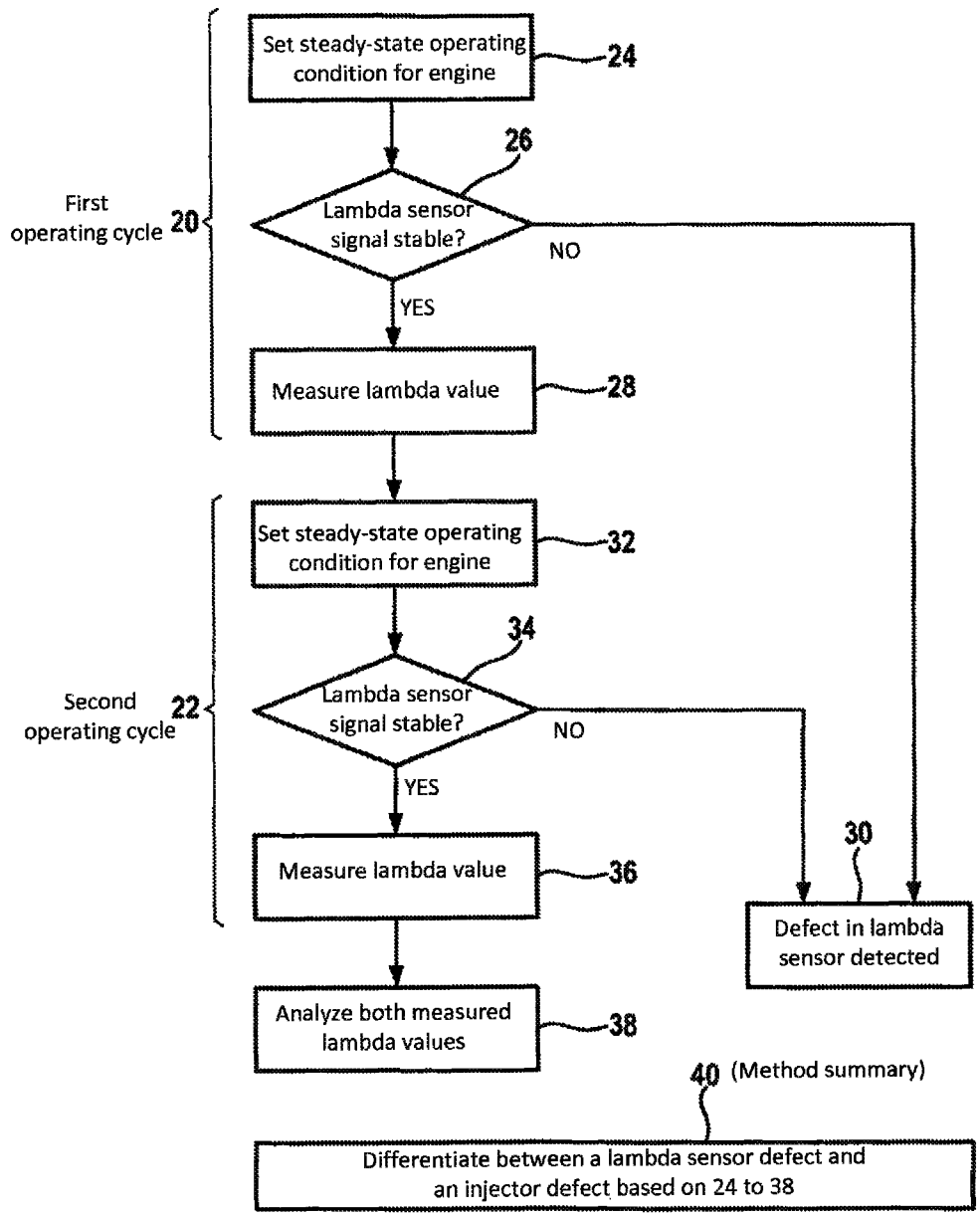
FIG. 2 shows a flow chart of a specific embodiment of the method according to the present invention.

A sequence of one specific embodiment of the method according to the present invention is represented schematically in the diagram from FIG. 2. The method includes two operating cycles 20, 22, which are to be performed one after the other. In first operating cycle 22, a steady-state operating condition for internal combustion engine 8 is first preset 24 and then set. Next, a stability 26 of a signal of lambda sensor 12, which measures the exhaust gases 14 of injector nozzle 10, is checked.

If the signal is stable, a measurement 28 of a lambda value is performed for exhaust gases 14 of injector nozzle 10. If the signal is not stable, a defect 30 in lambda sensor 12 is detected as part of an analysis.

If, during first operating cycle 20, it is found that the signal is stable, then at the start of second test cycle 22 a steady-state operating condition is preset 32 and set for internal combustion engine 8 after measurement 28 of the lambda value. Next, a stability 34 of a signal of lambda sensor 12 is again checked.

If the signal is not stable, a defect 30 in lambda sensor 12 is detected. If stability 34 of this signal exists and has been detected, then again a measurement 36 of the lambda value of lambda sensor 12 is carried out.

In a concluding analysis 38 of the lambda values for injector 10, ascertained in both measurements 28, 30, a check is performed on whether or not there is a defect in injector 10, here a so-called injector defect.

In a summary 40 of the method, a lambda sensor defect and an injector defect are differentiated and isolated, depending on whether lambda sensor 12 or injector 10 is the source of an existing defect.

This method may include more than just two operating cycles 20, 22 in one variant. Successively following operating cycles 20, 22 may be performed under the same operating condition or different operating conditions. At the start of a particular operating cycle 20, 22, the intended operating condition is set anew at the time of stipulation 24, 32.

What is claimed is:

1. A method for checking the functionality of at least one injector of an internal combustion engine, comprising:
   checking the functionality of a lambda sensor that ascertains a state of the at least one injector, by:
      setting a steady-state operating condition for the internal combustion engine; and
      performing a check as to whether at least one signal of the lambda sensor is stable for the set operating condition; and
   measuring a lambda value for the at least one injector by the lambda sensor at the set operating condition when the signal of the lambda sensor is stable for the set operating condition.

2. The method as recited in claim 1, wherein at least one lambda value measured for the at least one injector is analyzed to check the functionality of the at least one injector.

3. The method as recited in claim 1, wherein a check as to whether the signal of the lambda sensor reaches a stable target value is performed.

4. The method as recited in claim 1, wherein an overrun condition of the internal combustion engine is set as the operating condition.

5. The method as recited in claim 1, further comprising:
   determining that there exists a defect in the lambda sensor when the signal of the lambda sensor is not stable for the set operating condition.

6. The method as recited in claim 1, further comprising:
   determining based on the measured lambda value whether there exists a defect in the at least one injector.

7. The method as recited in claim 1, further comprising:
   after the measurement of the lambda value for the at least one injector has been performed, checking the functionality of the lambda sensor at least one second time, by:
      setting at least one additional steady-state operating condition for the internal combustion engine; and
      performing a check as to whether at least one signal of the lambda sensor is stable for the at least one additional set operating condition; and
   measuring a lambda value for the at least one injector using the lambda sensor at the at least one additional set operating condition when the signal of the lambda sensor is stable for the at least one additional set operating condition.

8. The method as recited in claim 7, wherein a first check and at least one second check of the functionality of the lambda sensor are performed under the same steady-state operating condition.

9. The method as recited in claim 7, wherein a first and at least one second check of the functionality of the lambda sensor are performed under different steady-state operating conditions.

10. The method as recited in claim 7, wherein the lambda values measured for the at least one injector are compared.

11. An apparatus for checking the functionality of at least one injector of an internal combustion engine, the apparatus initially checking the functionality of a lambda sensor that ascertains a state of the at least one injector, the apparatus comprising:
   a control unit that sets a steady-state operating condition for the internal combustion engine, and
   an analysis unit that checks whether at least one signal of the lambda sensor is stable for the set operating condition,
   wherein the apparatus measures a lambda value for the at least one injector using the lambda sensor at the set operating condition when the signal of the lambda sensor is stable for the set operating condition.

12. The apparatus as recited in claim 11, wherein the analysis unit determines:
   that the lambda sensor is not functional if the signal is not stable, and
   that the lambda sensor is functional if the signal is stable.

13. The apparatus as recited in claim 11, wherein the analysis unit determines that there exists a defect in the lambda sensor when the signal of the lambda sensor is not stable for the set operating condition.

14. The apparatus as recited in claim 11, wherein the analysis unit determines based on the measured lambda value whether there exists a defect in the at least one injector.

15. A non-transitory computer readable storage medium storing a computer program having program codes which when executed on a computer performs a method for checking the functionality of at least one injector of an internal combustion engine, said method comprising:
   checking the functionality of a lambda sensor that ascertains a state of the at least one injector, by:
      setting a steady-state operating condition for the internal combustion engine; and
      Performing a check as to whether at least one signal of the lambda sensor is stable for the set operating condition; and
   measuring a lambda value for the at least one injector by the lambda sensor at the set operating condition when the signal of the lambda sensor is stable for the set operating condition.

16. The storage medium as recited in claim 15, wherein the method further comprises:
   determining that there exists a defect in the lambda sensor when the signal of the lambda sensor is not stable for the set operating condition.

17. The storage medium as recited in claim 15, wherein the method further comprises:
   determining based on the measured lambda value whether there exists a defect in the at least one injector.

\* \* \* \* \*

UNITED STATES PATENT AND TRADEMARK OFFICE
CERTIFICATE OF CORRECTION

PATENT NO. : 8,650,941 B2 Page 1 of 1
APPLICATION NO. : 12/998010
DATED : February 18, 2014
INVENTOR(S) : Zeidler et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 343 days.

Signed and Sealed this
Twenty-ninth Day of September, 2015

Michelle K. Lee
*Director of the United States Patent and Trademark Office*